United States Patent [19]

Bauer

[11] Patent Number: 4,939,812
[45] Date of Patent: Jul. 10, 1990

[54] EXTERNAL DOOR HANDLE FOR A MOTOR VEHICLE

[75] Inventor: Karl-Heinz Bauer, Gärtringen, Fed. Rep. of Germany

[73] Assignee: Daimler-Benz AG, Fed. Rep. of Germany

[21] Appl. No.: 279,561

[22] Filed: Dec. 5, 1988

[30] Foreign Application Priority Data

Dec. 4, 1987 [DE] Fed. Rep. of Germany ....... 3741094

[51] Int. Cl.⁵ .............................................. E05B 1/00
[52] U.S. Cl. ............................. 16/110 R; 16/DIG. 12
[58] Field of Search ............ 16/110 R, 111 R, 116 A, 16/126, DIG. 2; 292/336.3, 347, DIG. 12; 15/246

[56] References Cited

U.S. PATENT DOCUMENTS 1,010,133 11/1911 Fleming ..................... 16/DIG. 12
2,766,059 10/1956 Michalsky .................... 292/336.3

FOREIGN PATENT DOCUMENTS 2214425 10/1973 Fed. Rep. of Germany .
2403690 7/1975 Fed. Rep. of Germany .
2854423 6/1980 Fed. Rep. of Germany .
3338960 8/1985 Fed. Rep. of Germany .

*Primary Examiner*—Nicholas P. Godici
*Assistant Examiner*—Carmine Cuda
*Attorney, Agent, or Firm*—Evanson, Wands, Edwards, Lenahan & McKeown

[57] ABSTRACT

An external door handle for a motor vehicle with a cleaning device for removing dirt and slush which accumulates on the handle when the vehicle is driven on slushy or muddy routes or when the vehicle is stationary.

10 Claims, 1 Drawing Sheet

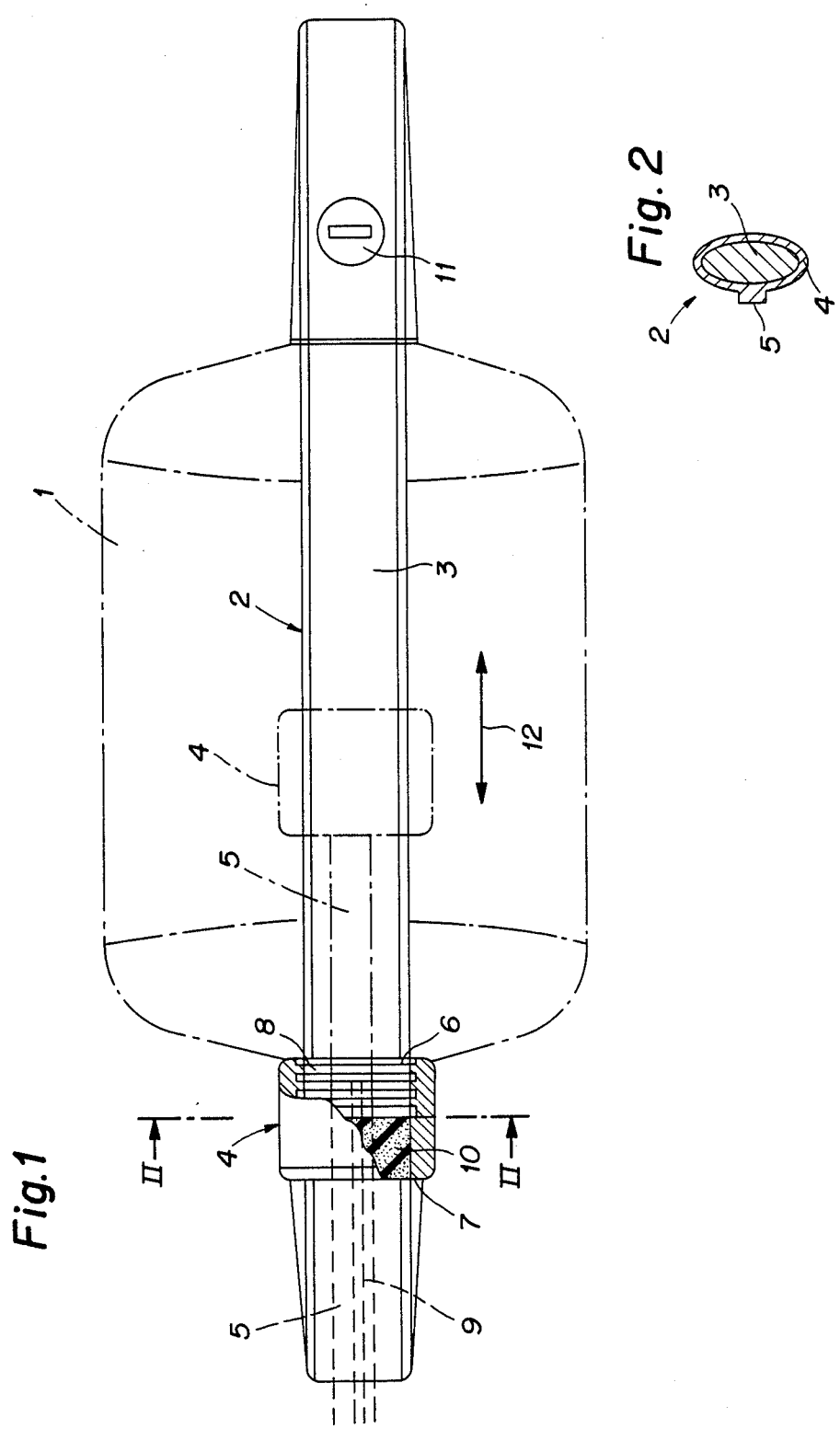

EXTERNAL DOOR HANDLE FOR A MOTOR VEHICLE

BACKGROUND & SUMMARY OF THE INVENTION

The invention relates to a handle, useful as an external door handle for a motor vehicle, wherein the handle is a strap handle and has a gripping zone along its length.

Handles of this kind, especially when they are external door handles, can easily become soiled, for example when the vehicle is driven on wet, slushy or muddy roads and tracks.

In the case of external door handles of motor vehicles, the protection of the latter by supplementary devices against soiling caused by the relative wind has therefore already been disclosed. Devices of this kind described, for example, in German Offenlegungsschrift No. 2,214,425, German Pat. No. 2,403,690 and German Pat. No. 3,338,960 the principle of protecting the handle from the accumulation of dirt by elements which deflect the relative wind.

However, in many cases these known measures provide inadequate protection.

In particular, all these measures can only keep dirt away from the handle when the vehicle itself is in motion. In contrast, when the vehicle is stationary, such devices offer virtually no protection against dirt which is thrown against the door handle by other vehicles or which accumulates thereon in some other manner.

An object of the invention provides a cleaning device which provides for a clean condition to a handle for the person who wishes to use it, irrespective of how it became dirty and irrespective of the type of handle used.

This object is achieved on a handle of the generic type by providing a displaceable slide which moves across the gripping portion of the handle and touches, scrapes or brushes the gripping portion.

In contrast to the prior art described above, the solution according to the invention does not aim to prevent deposition of dirt, but rather aims to reliably and completely remove already deposited dirt before each use of the handle. The result, a self-cleaning handle, thus differs not only in structure, but also fundamentally from the known dirt prevention devices.

The slide which effects the cleaning of the door handle is preferably moved from outside the handle by a drive mechanism situated in the vehicle door.

Means are provided for triggering the drive in such a way that the handle is cleaned automatically before being grasped by a person using the handle. Thus initiation of the cleaning action can be in response to a trigger means connected for example to an inside door handle, a door key lock, or a remote control device, etc..

Other objects, advantages and novel features of the present invention will become apparent from the following detailed description of the invention when considered in conjunction with the accompanying drawings.

BRIEF DESCRIPTION OF THE DRAWINGS

FIG. 1 shows the view of an external door handle which can be mounted in the handle recess of a motor vehicle door; and FIG. 2 shows a section through the slide mounted so as to slide on the strap of the door handle, according to line II—II in FIG. 1.

DETAILED DESCRIPTION OF THE DRAWINGS

FIG. 1 shows an external door handle 2 fitted in a handle recess 1, of a motor vehicle door (not shown). The grasping zone is formed by a central section of the door handle designed as a strap 3. This strap has an approximately uniform cross-sectional profile along its length as can be seen in FIG. 2.

A slide 4 is arranged on the strap 3 so as to be able to slide over the entire grasping zone accessible to a user.

In the drawing, the slide is illustrated in an end position in which it is not in use. If it is desired to clean the strap 3, the slide 4 is set in motion to be displaced from the above-mentioned end position over the entire length of the strap to the other end of the strap and back again to its original end position. During this process, the slide 4 is guided on the strap 3. The drive (not shown) for the movement of the strap can be based on any desired servomotor and is situated inside the vehicle door associated with the handle recess 1. The slide 4 is linked to the servomotor (not shown) via a rod 5. The slide 4, which fits in annular fashion around the strap 3 has two internal chambers 6; 7 which, in the axial direction, adjoin one another, and are open to the strap surface 3. The chamber 6 contains an annular rubber lamellae 8 which acts like a windscreen wiper. When the slide 4 moves across the strap 3, the lamellae 8 acts in a wiping fashion against the surfaces of the strap 3.

Fluid can be admitted to the chamber 7 at the opposite end face of the slide via a line 9 connected to the rod 5. The fluid fed into the chamber 7 is therein absorbed by a sponge 10. By means of the sponge 10 supplied with fluid, the dirt deposited on the strap 3 of the door handle 2 can be moistened and thus removed more efficiently by the wiping lamellae 8. The wiping lamellae 8 are advantageously oriented so that they develop their full wiping effect only on the return journey of the slide 4 into its inoperative end position.

Instead of the wiping lamellae 8, the slide 4 can be provided with a brush. In this case, a separate chamber for the supply of a cleaning fluid can be omitted.

The drive of the slide 4 can be triggered by pushing the car key into the door lock 11. However, triggering is also possible by remote control. When the vehicle door is opened from inside the vehicle, the drive for the slide 4 can be triggered by actuating the internal door handle.

The direction in which the slide moves backwards and forwards on the strap 3 of the door handle 2 is indicated by the arrow 12. The chain-dotted representation of the slide 4 illustrates an intermediate position of the slide 4 between the two end positions.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An outside vehicle door handle means for opening a vehicle door comprising:
   a strap which has a user gripping zone;
   the strap is attached to the outside of the vehicle door and is formed with an approximately uniform cross-sectional profile along its longitudinal direction;
a displaceable slide means is provided and has portions which are arranged over the periphery of the strap for at least one of touching, scraping and brushing the gripping zone of the strap as the slide means is displaced along the strap to remove filth that has accumulated on the strap.

2. A handle mechanism for a vehicle comprising:
a strap which has a user gripping zone;
the strap is formed with an approximately uniform cross-sectional profile along its longitudinal direction;
a displaceable slide means is provided and has portions which are arranged over the periphery of the strap for at least one of touching, scraping and brushing the gripping zone of the strap as the slide means is displaced along the strap, wherein the slide means is linked to a drive means for displacing the slide means which drive means is located externally of the strap.

3. A handle according to claim 2, wherein there is a trigger means for the drive means to initiate a backward and forward movement of the slide means over the gripping zone of the strap.

4. A handle according to claim 3, wherein the drive means is triggered by at least one of a key which can be inserted into the handle and by a remote control signal.

5. A handle according to claim 4, wherein the handle is an external door handle for a motor vehicle and wherein the remote control signal is triggered from an internal door handle for a motor vehicle.

6. A door handle according to claim 1, wherein the strap itself provides a guide path for the slide means.

7. A handle mechanism for a vehicle comprising:
a strap which has a user gripping zone;
the strap is formed with an approximately uniform cross-sectional profile along its longitudinal direction;
a displaceable slide means is provided and has portions which are arranged over the periphery of the strap for at least one of touching, scraping and brushing the gripping zone of the strap as the slide means is displaced along the strap, wherein the portions of the slide means which scrape the gripping zone of the strap are annular rubber wiping lamellae.

8. A door handle according to claim 1, wherein the portion providing scraping of the gripping zone is situated at one end of the slide means and a fluid-distributing means connected to a fluid source outside the handle is situated at the other end of the slide means.

9. A door handle according to claim 8, wherein the fluid-distributing means is a chamber immediately adjoining and open towards the strap.

10. A door handle according to claim 8, wherein the fluid distribution means includes a material means for absorbing fluid.

* * * * *